United States Patent [19]

Groos et al.

[11] Patent Number: 4,935,594
[45] Date of Patent: Jun. 19, 1990

[54] ERODING ELECTRODE, IN PARTICULAR A WIRE ELECTRODE FOR THE SPARKEROSIVE WORKING

[75] Inventors: Heinrich Groos, Herborn; Hans Hermanni, Sinn-Fleisbach, both of Fed. Rep. of Germany

[73] Assignee: Berkenhoff GmbH, Heuchelheim, Fed. Rep. of Germany

[21] Appl. No.: 260,905

[22] Filed: Oct. 21, 1988

[30] Foreign Application Priority Data

Oct. 23, 1987 [EP] European Pat. Off. ........ 87710018.0

[51] Int. Cl.$^5$ .............................................. B23H 7/08
[52] U.S. Cl. .................................. 219/69.12; 148/13.1
[58] Field of Search .................. 219/69.12, 388 S, 390; 148/13, 13.1, 13.2; 204/206, 280; 427/58, 117, 123, 126.1

[56] References Cited

U.S. PATENT DOCUMENTS

| | | | |
|---|---|---|---|
| 4,287,404 | 9/1981 | Convers et al. | 219/69.12 |
| 4,295,033 | 10/1981 | Lindgren et al. | 219/388 S |
| 4,341,939 | 7/1982 | Briffod et al. | 219/69.15 |

FOREIGN PATENT DOCUMENTS

| | | | |
|---|---|---|---|
| 249528 | 12/1985 | Japan | 219/69.12 |
| 136733 | 6/1986 | Japan | 219/69.12 |
| 218026 | 9/1987 | Japan | 219/69.12 |

*Primary Examiner*—A. D. Pellinen
*Assistant Examiner*—Geoffrey S. Evans
*Attorney, Agent, or Firm*—Flynn, Thiel, Boutell & Tanis

[57] ABSTRACT

A method for manufacturing an eroding electrode which has an outer layer consisting of a structural composition having a resistance against erosive wear characteristic many times greater than the common eroding electrode. The outer layer initially consists of one or several coatings of a metal alloy having a low volatilization temperature encasing a core of metal or a metal alloy. The encased wire electrode is then annealed at such temperatures until an alloy, which extends from the outer surface of the encasement toward the core, is created and which has a decreasing content of the consitutents of the low volatilzation temperature material or alloy, after which the wire electrode is cooled in a controlled manner to fix the diffusion states.

20 Claims, 1 Drawing Sheet

ERODING ELECTRODE, IN PARTICULAR A WIRE ELECTRODE FOR THE SPARKEROSIVE WORKING

FIELD OF THE INVENTION

The invention relates to a method for the manufacture of an eroding electrode, in particular a wire electrode, for the electro-erosive cutting of workpieces, comprising a core of metal or a metal alloy, for example copper, onto the outer surface of which one or several coatings exist of a metal or metal alloy having a low volatilization temperature, as for example zinc.

BACKGROUND OF THE INVENTION

In the electro-erosive wire cutting of a workpiece, a continuous wirelike, thread-shaped or similarly elongated electrode of a greater length is transported axially from a feeding side of a workpiece to a receiving side through a cutting area on a workpiece, which cutting area is flushed with a working fluid of a dielectric nature or an electrolyte of a suitable conductivity.

An electric working current flows between the continuous wire electrode and the workpiece through a small work gap formed therebetween.

A wire made of an electrically conducting material, for example of copper, brass, steel, molybdenum, Wolfram or another metal or metal alloy or also so-called wrapped wires with a core and with layers of metal and metal alloys with a low volatilization temperature contained thereon, is used as a continuous elongated electrode for technical manufacturing reasons. These materials meet only in a limited manner the requirements which are made on the electrode during an electro-erosive wire cutting operation.

The electric discharge energy volatilizes not only the workpiece material, which is a requirement, but also, to a significant degree, the material of the continuous electrode, which results in inconsistent dimensions along the length of the wire.

SUMMARY OF THE INVENTION

Therefore the basic purpose of the invention is to provide an eroding electrode with a coating of the above-mentioned type, in particular, a wire electrode which has a structural composition in its outer coating having a much greater resistance with respect to erosive wear than the common eroding electrode.

BRIEF DESCRIPTION OF THE DRAWING

A preferred embodiment of the present invention is described hereinafter with reference to the drawing, in which.

DETAILED DESCRIPTION

The reason for the high ruggedness of the inventive eroding electrode is that coatings of alloys are produced with the inventive method which cannot be produced conventionally through cold-working. In the inventive method, and for example in the case of Cu-Zn alloys, cubic body-centered solid solutions of alpha-beta and/or beta-gamma phases are formed which, compared with thus possible cubic face-centered Alpha solid solutions, have a substantially stronger resistance to erosion behavior characteristic.

What is special in the case of the invention is that these especially hard and brittle solid solutions which are generally undesired in chipless shaping, have proven to be very wear-resistant during the occurrence of discharge impulses and at the same time has improved the ionization capability in the discharge channel.

It is known that impulses rich in high energy are produced with modern spark-erosion wire-cutting systems, which impulses cause a high amount of wear in electrodes which have been used so far. The known continuous electrodes lose their consistent dimension characteristic. Since in spark-erosion technology we are dealing with an energy focussing method and the distance between the workpiece and the electrode always remains the same, the inconsistent dimension of the electrode leads simultaneously to the inexact erosion of the material of the workpiece to be worked. This is avoided with an electrode according to the invention.

Figure 1A:
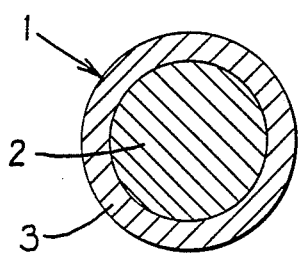
FIG. 1A is a cross-sectional view of a wire electrode prior to the process of the invention.
Figure 1B:
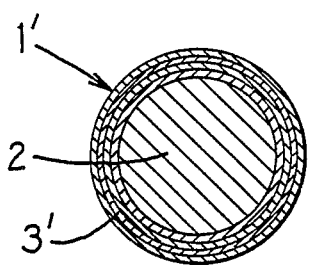
FIG. 1B is a view similar to FIG. 1A, illustrating the wire electrode of the present invention.

Referring to FIGS. 1A and 1B, making an eroding electrode according to the invention, a core 2 with a diameter of 0.1 to 0.6 mm. can be used as an initial material, onto which core is applied an original material coat 3 (FIG. 1A) consisting of zinc, cadmium, bismuth, antimony or an alloy of these metals. Such a wire 1 is annealed at 700°–850° C. most advantageously during passage through a protective gas and is subsequently cooled off to less than 80° C. also using a protective gas. In this manner an altered coating 3' (FIG. 1B) having the aforementioned advantageous characteristics is produced.

The core 2 of the wire 1' consists advantageously of an electrolytic copper having more than 99.0 percentage by weight of copper and a very low oxygen content. A copper-zinc-alloy having 79.5–80.5 percentage by weight of Cu, the remainder being Zn, can also advantageously be used.

If a core 2 having a diameter of 0.30 mm. and an original zinc coating 3 of 5 $\mu$m is used, same can be treated during passage through a tube oven at a speed of 40 m./min. with heat being applied over a 4000 mm. length and a subsequent cooling being applied over a 1800 mm. length, when the heating phase is at a temperature of 750°+/−25° C. The wire 1' then exits the cooling phase at a temperature of less than 80° C. Nitrogen can for example be used as a protective gas in the heating phase and also in the cooling phase. The cooling step is preferably between 20–50% as long as the annealing step.

The inventive heat treatment and a defined or controlled cooling phase produces the altered coating or encasement structure 31 on the electrode 1', which electrode previously included a core coated with an original coating 3 made from metal having a low volatilization energy characteristic, or an alloy of such metal. The heat-treatment temperature is in the range of 454° to 902° C. for Cu-Zn alloys. The altered coating 3' includes layers of a mixed structure of metallic phases, and its content of the low volatilization temperature metal decreases as the altered coating 3' extends from its outer surface to the core 2. The layers of metallic phases include alpha-beta phases and beta-gamma phases.

The embodiments of the invention in which an exclusive property or privilege is claimed are defined as follows:

1. In a method for the manufacture of an eroding wire electrode for use in the spark-erosive cutting of electrically conductive materials, said electrode comprising a core of one of a metal and a metal alloy and at least one coating of one of a metal having a low volatilization temperature and an alloy of said last-mentioned metal, the improvement wherein for producing an altered coating, which can be cold-shaped only to a limited degree and is active during spark-erosive cutting, out of said first-mentioned coating, said wire electrode is annealed substantially at said low volatilization temperature until said altered coating is created, said altered coating including an alloy which extends from an outer surface of said wire electrode toward said core with a corresponding decreasing content of said metal having said low volatilization temperature, and wherein said wire electrode is subsequently cooled in a controlled manner to fix the diffusion states.

2. The method according to claim 1, wherein said core is one of copper and a copper alloy and, prior to said annealing step, has applied thereto said first-mentioned coating, said first-mentioned coating being made from one of zinc, cadmium, bismuth, antimony and an alloy of at least one of zinc, cadmium, bismuth and antimony, and wherein after annealing and cooling, said altered coating comprises metal layers of a mixed structure of metallic phases.

3. The method according to claim 1, wherein said core consists of one of copper and a copper-zinc alloy and wherein zinc is applied prior to said annealing step as said first-mentioned coating, and wherein said core and said first-mentioned coating have after said annealing step, through controlled cooling, at least one layer of at least one of alpha-beta-phases and beta-gamma-phases.

4. The method according to claim 3, wherein said temperature for said annealing step depends on a desired thickness and construction of said layers and ranges between 454° and 902° C.

5. The method according to claim 4, wherein a critical interval for said annealing step lasts until a complete alloying of said first-mentioned coating occurs.

6. The method according to claim 5, wherein a cooling time for said cooling step is between 20% and 50% of said critical interval.

7. The method according to claim 1, wherein said annealing step occurs in a continuous manner.

8. The method according to claim 1, wherein said wire electrode, prior to said annealing step is plastically deformed so that its diameter is approximately equal to a desired end diameter.

9. The method according to claim 8, wherein said electrode is calibrated after said annealing step.

10. The method according to claim 1, wherein said core has a diameter in a range of 0.1–0.6 mm, said first-mentioned coating consists of one of zinc, cadmium, bismuth, antimony and an alloy of at least one of zinc, cadmium, bismuth and antimony and has a thickness in a range of 1–30 μm, wherein said wire electrode is guided through said annealing step at temperatures in a range of 700°–850° C., and wherein the length of said cooling step is chosen such that said wire electrode has an exiting temperature of less than 80° C., said annealing step and said cooling step being thereby carried out with a protective gas.

11. The method according to claim 1, wherein an electrolytic copper is used as said core, a copper content of which is in percentage by weight larger than 99.9% and an oxygen content of which lies between 0.005% and 0.040%.

12. The method according to claim 11, wherein said core has a diameter of 0.30 mm and said first-mentioned coating is 5 μm thick and made from zinc.

13. The method according to claim 12, wherein said wire electrode is moved through a tube oven over 4000 mm at a temperature in a range of 725°–775° C. during said annealing step and subsequently is cooled over 1800 mm in said cooling step, said wire electrode being moved at a speed of 40 m./min., said heating and cooling steps occurring using a protective gas.

14. The method according to claim 13, wherein nitrogen is said protective gas.

15. The method according to claim 1, wherein said core consists of a copper-zinc alloy with 79.5–80.5 percentage by weight of copper, the remainder being zinc.

16. The method according to claim 15, wherein said core has a diameter of 0.30 mm and said first-mentioned coating is 5 μm thick and made of zinc.

17. A method according to claim 16, wherein said wire electrode is moved through a tube oven over 4000 mm at a temperature in a range of 725°–775° C. during said annealing step and subsequently is cooled over 1800 mm in said cooling step, said wire electrode being moved at a speed of 40 m./min., said heating and cooling steps occurring using a protective gas.

18. The method according to claim 17, wherein nitrogen is said protective gas.

19. In a wire eroding electrode for use in spark-erosive cutting of electrically conductive materials, the improvement wherein said wire electrode has a core which consists of a homogeneous alloy and a coating formed on, surrounding, and extending outwardly from said core to define an outer layer and an outer surface of said wire electrode, said coating being made from an alloy having primary and secondary alloy constituents, a concentration of said secondary alloy constituent in said alloy of said coating decreasing from said outer surface to said core.

20. The wire electrode according to claim 19, wherein said secondary alloy constituent is a metal having a low volatilization temperature.

* * * * *

REEXAMINATION CERTIFICATE (3965th)

United States Patent [19]
Groos et al.

[11] B1 4,935,594
[45] Certificate Issued Jan. 4, 2000

[54] ERODING ELECTRODE IN PARTICULAR A WIRE ELECTRODE FOR THE SPARKEROSIVE WORKING

[75] Inventors: Heinrich Groos, Herborn; Hans Hermanni, Sinn-Fleisbach, both of Germany

[73] Assignee: Berkenhoff GmbH, Heuchelheim, Germany

Reexamination Request:
No. 90/005,071, Aug. 17, 1998

Reexamination Certificate for:
Patent No.: 4,935,594
Issued: Jun. 19, 1990
Appl. No.: 07/260,905
Filed: Oct. 21, 1988

[30] Foreign Application Priority Data

Oct. 23, 1987 [EP] European Pat. Off. ............. 87710018

[51] Int. Cl.[7] .................................................... B23H 7/08
[52] U.S. Cl. ........................................ 219/69.12; 148/536
[58] Field of Search .............................. 219/69.12, 69.15, 219/388 S, 390; 148/682, 683, 685, 687, 432, 536; 204/206, 280; 427/58, 117, 123, 126.1

[56] References Cited

U.S. PATENT DOCUMENTS

| | | | |
|---|---|---|---|
| 3,516,805 | 6/1970 | Nakamura et al. | 29/196.3 |
| 3,746,827 | 7/1973 | Martin et al. | 219/69.15 |
| 4,093,453 | 6/1978 | Makino et al. | 75/129 |
| 4,287,404 | 9/1981 | Convers et al. | 219/69.12 |
| 4,295,033 | 10/1981 | Lindgren et al. | 219/388 S |
| 4,341,939 | 7/1982 | Briffod et al. | 219/69.15 |
| 4,574,604 | 3/1986 | Vogel et al. | 148/687 |
| 4,673,790 | 6/1987 | Sawada et al. | 219/69.12 |
| 4,686,153 | 8/1987 | Tominaga et al. | 428/610 |
| 4,717,804 | 1/1988 | Tomalin | 219/69.12 |
| 4,814,235 | 3/1989 | Hecht et al. | 148/432 |
| 4,839,487 | 6/1989 | Ito et al. | 219/69.12 |
| 4,977,303 | 12/1990 | Brifford | 219/69.12 |

FOREIGN PATENT DOCUMENTS

| | | |
|---|---|---|
| 60-249528 | 12/1985 | Japan . |
| 61-71925 | 4/1986 | Japan . |
| 61-76215 | 4/1986 | Japan . |
| 61-136733 | 6/1986 | Japan . |
| 62-218026 | 9/1987 | Japan . |
| 646083 | 11/1984 | Sweden . |

OTHER PUBLICATIONS

*Constitution of Binary Alloys, First Supplement,* by Elliot, p. 390, published by McGraw–Hill Book Company, Dec. 1965.

*Primary Examiner*—Geoffrey S. Evans

[57] ABSTRACT

A method for manufacturing an eroding electrode which has an outer layer consisting of a structural composition having a resistance against erosive wear characteristic many times greater than the common eroding electrode. The outer layer initially consists of one or several coatings of a metal alloy having a low volatilization temperature encasing a core of metal or a metal alloy. The encased wire electrode is then annealed at such temperatures until an alloy, which extends from the outer surface of the encasement toward the core, is created and which has a decreasing content of the consitutents of the low volatilzation temperature material or alloy, after which the wire electrode is cooled in a controlled manner to fix the diffusion states.

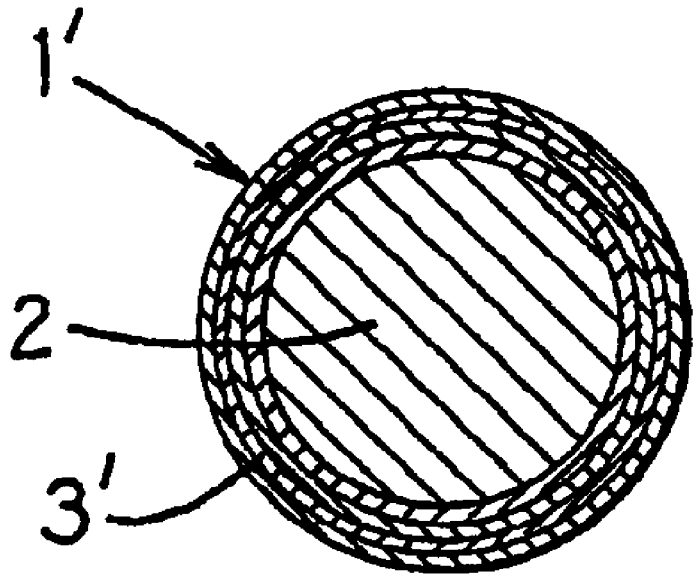

B1 4,935,594

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 6, 10, 12, 15, 19 and 20 are cancelled.

Claims 2, 3, 4, 7, 8, 11, 13 and 16 are determined to be patentable as amended.

Claims 5, 9, 14, 17, and 18, dependent on an amended claim, are determined to be patentable.

New claims 21, 22, 23, 24, 25, 26, 27, 28 and 29 are added and determined to be patentable.

2. The method according to claim [21] *21*, wherein said core, prior to said annealing step, has applied thereto said first-mentioned coating, said first-mentioned coating being made from one of zinc, cadmium, bismuth, antimony and an alloy of at least one of zinc, cadmium, bismuth and antimony, and wherein after annealing and cooling, said altered coating comprises metal layers of a mixed structure of metallic phases.

3. The method according to claim [21] *21*, wherein zinc is applied prior to said annealing step as said first-mentioned coating, and wherein said core and said first-mentioned coating have after said annealing step, through controlled cooling, at least one layer of at least one of alpha-beta-phases and beta-gamma-phases.

4. The method according to claim 3, wherein said temperature for said annealing step depends on a desired thickness and construction of said layer[s and ranges between 454° and 902° C].

7. The method according to claim [21] *21*, wherein said annealing step occurs in a continuous manner.

8. The method according to claim [21] *21*, wherein said wire electrode, prior to said annealing step is plastically deformed so that its diameter is approximately equal to a desired end diameter.

11. The method according to claim [21] *21*, wherein an electrolytic copper is used as said core, a copper content of which is in percentage by weight larger that 99.9% and an oxygen content of which lies between 0.005% and 0.04%.

13. The method according to claim [12] *24*, wherein said wire electrode is moved through a tube oven over 4000 mm at a temperature in a range of 725°–775° C. during said annealing step and subsequently is cooled over 1800 mm in said cooling step, said wire electrode being moved at a speed of 40 m./min., said heating and cooling steps occurring using a protective gas.

16. The method according to claim [15] *25*, wherein said core has a diameter of 0.30 mm and said first-mentioned coating is 5 μm thick and made of zinc.

*21. In a method for the manufacture of an eroding wire electrode for use in the spark-erosive cutting of electrically conductive materials, said electrode comprising a core of one of copper and a copper alloy and at least one coating of one of zinc and an alloy of zinc, the improvement wherein for producing an altered coating, which can be cold-shaped only to a limited degree and is active during spark-erosive cutting, out of said first-mentioned coating, comprising the steps of: annealing substantially said wire electrode at a temperature between 454° and 902° C. until said altered coating is created, said altered coating including a copper-zinc alloy which contains beta crystals throughout the thickness thereof with at least one of alpha and gamma crystals also being present and extends from an outer surface of said wire electrode substantially to said core with a corresponding decreasing content of zinc and subsequently cooling said wire electrode in a controlled manner to fix the copper-zinc alloy containing said beta crystals throughout the thickness thereof with said at least one of alpha and gamma crystals also being present.*

*22. In a wire eroding electrode for use in spark-erosive cutting of electrically conductive materials, the improvement wherein said wire electrode has a core which consists of a homogeneous copper-zinc alloy and a coating formed on, surrounding and extending outwardly from said core to define an outer layer and an outer surface of said wire electrode, said coating being made from a copper-zinc alloy which contains beta crystals throughout the thickness thereof with at least one of alpha and gamma crystals also being present in the alloy and extends from the outer surface substantially to the core, the concentration of zinc in said alloy decreasing from said outer surface to said core.*

*23. A method for the maufacture of an eroding wire electrode for use in the spark-erosive cutting of electrically conductive materials, said electrode comprising a core of one of a metal and a metal alloy and having a diameter in a range of 0.1–0.6 mm and at least one coating of one of a metal having a low volatilization temperature and an alloy of said last–mentioned metal and consisting of one of zinc, cadmium, bismuth, antimony and an alloy of at least one of zinc, cadmium, bismuth and antimony and having a thickness in a range of 1–30 μm, wherein an altered coating is produced, which can be cold-shaped only to a limited degree and is active during spark-erosive cutting, out of said first-mentioned coating, comprising the steps of: annealing substantially said wire electrode at said low volatilization temperature until said altered coating is created by guiding said wire electrode through said annealing step at temperatures in a range of 700°–850° C., said altered coating including an alloy which extends from an outer surface of said wire electrode towards said core with a corresponding decreasing content of said metal having said low volatilization temperature and subsequently cooling said wire electrode in a controlled manner to fix the diffusion states, the length of the cooling step being chosen such that said wire electrode has an exiting temperature of less than 80° C. and said annealing step and cooling step being carried out with a protective gas.*

*24. A method for the manufacture of an eroding wire electrode for use in the spark-erosive cutting of electrically conductive materials, said electrode comprising a core of an electrolytic copper having a copper content, in percentage by weight, greater than 99.9% and an oxygen content lying between 0.005% and 0.040% and a diameter of 0.30 mm and a zinc coating having a thickness of 5 μm, wherein an altered coating is produced, which can be cold-shaped only to a limited degree and is active during spark-erosive cutting, out of said zinc coating, comprising the steps of: annealing substantially said wire electrode at a temperature between 454° and 902° C. until said altered coating is created, said altered coating including an alloy which extends from an* outer surface of said wire electrode toward said core with a corresponding decreasing content of zinc and subsequently cooling the wire electrode in a controlled manner to fix the diffusion states.

25. A method for the manufacture of an eroding wire electrode for use in the spark-erosive cutting of electrically conductive materials, said electrode comprising a core consisting of a copper-zinc alloy with 79.5–80.5 percentage by weight of copper, the remainder being zinc, and at least one coating of one of a metal having a low volatilization temperature and an alloy of said last-mentioned metal, wherein an altered coating is produced, which can be cold-shaped only to a limited degree and is active during spark-erosive cutting, out of said first-mentioned coating, comprising the steps of: annealing substantially said wire electrode at said low volatilization temperature until said altered coating is created, said altered coating including an alloy which extends form an outer surface of said wire electrode toward said core with a corresponding decreasing content of said metal having said low volatilization temperature and subsequently cooling said wire electrode in a controlled manner to fix the diffusion states.

26. In a method for the manufacture of an eroding wire electrode for use in the spark-erosive cutting of electrically conductive materials, said electrode comprising a core of one of copper and a copper alloy and a zinc coating which is applied prior to an annealing step, the improvement wherein for producing an altered coating including a copper-zinc alloy containing at least one layer of at least one alpha-beta phases and beta-gamma phases which extends from an outer surface of said wire electrode toward said core with a corresponding decreasing content of zinc and which can be cold-shaped only to a limited degree and is active during spark erosive cutting, out of said zinc coating, comprising the steps of: annealing substantially said wire electrode at a temperature depending on a desired thickness and construction of said at least one layer and ranging between 454° and 902° C., a critical interval of the annealing step lasting until a complete alloying of the zinc coating occurs and cooling the annealed wire electrode in a controlled manner to fix the diffusion states, the cooling time being between 20% and 50% of the critical interval.

27. In a wire eroding electrode for use in spark-erosive cutting of electrically conductive materials, the improvement wherein said wire electrode has a core which consists of a homogeneous copper-zinc alloy and a coating formed on, surrounding and extending outwardly from said core to define an outer layer and an outer surface of said wire electrode, said coating being made from a copper-zinc alloy which contains at least one layer of at least one of alpha-beta phases and beta-gamma phases which extends throughout the thickness thereof and extends from the outer surface substantially to the core, the concentration of zinc in said alloy decreasing from said outer surface to said core.

28. In a method for the manufacture of an eroding wire electrode for use in the spark-erosive cutting of electrically conductive materials, said electrode comprising a core of one of copper and a copper alloy and at least one coating of one of zinc and an alloy of zinc, the improvement wherein for producing an altered coating, which can be cold-shaped only to a limited degree and is active during spark-erosive cutting, out of said first-mentioned coating, comprising the steps of: annealing substantially said wire electrode at a temperature between 454° and 902° C. until said altered coating is created, said altered coating being made from a copper-zinc alloy which contains at least one of alpha-beta and beta-gamma crystals throughout the thickness thereof and extends from an outer surface of said wire electrode substantially to said core with a corresponding decreasing content of zinc and subsequently cooling said wire electrode in a controlled manner to fix the copper-zinc alloy containing at least one of alpha-beta and beta-gamma crystals throughout the thickness thereof.

29. In a wire eroding electrode for use in spark-erosive cutting of electrically conductive materials, the improvement wherein said wire electrode has a core which consists of a homogeneous copper-zinc alloy and a coating formed on, surrounding and extending outwardly from said core to define an outer layer and an outer surface of said wire electrode, said coating being made from a copper-zinc alloy which contains at least one of alpha-beta and beta-gamma crystals throughout the thickness thereof and extends from the outer surface substantially to the core, the concentration of zinc in said alloy decreasing from said outer surface to said core.

\* \* \* \* \*

(12) REEXAMINATION CERTIFICATE (4827th)
United States Patent
Groos et al.

(10) Number: US 4,935,594 C2
(45) Certificate Issued: Aug. 5, 2003

(54) ERODING ELECTRODE, IN PARTICULAR A WIRE ELECTRODE FOR THE SPARKEROSIVE WORKING

(75) Inventors: Heinrich Groos, Herborn (DE); Hans Hermanni, Sinn-Fleisbach (DE)

(73) Assignee: Berkenhoff GmbH, Heuchelheim (DE)

Reexamination Request:
No. 90/006,086, Aug. 20, 2001

Reexamination Certificate for:
Patent No.: 4,935,594
Issued: Jun. 19, 1990
Appl. No.: 07/260,905
Filed: Oct. 21, 1988

Reexamination Certificate B1 4,935,594 issued Jan. 4, 2000

(30) Foreign Application Priority Data

Oct. 23, 1987 (EP) .............................. 87710018

(51) Int. Cl.$^7$ ................................. B23H 7/08
(52) U.S. Cl. ..................... 219/69.12; 148/536
(58) Field of Search ................ 219/69.12, 69.15, 219/69.17, 69.11, 146.1, 145.1, 146.21, 146.22, 155; 148/536, 527, 516, 682, 683, 687, 432, 434; 420/469, 477

(56) References Cited

U.S. PATENT DOCUMENTS

| | | | |
|---|---|---|---|
| 3,516,805 A | 6/1970 | Nakamura et al. | 29/196.3 |
| 4,341,939 A | 7/1982 | Briffod et al. | 219/69 W |
| 4,448,655 A * | 5/1984 | Inoue | 204/129.1 |
| 4,631,237 A * | 12/1986 | Dommer et al. | 428/621 |
| 4,686,153 A | 8/1987 | Tominaga et al. | 428/610 |
| 4,717,804 A | 1/1988 | Tomalin | 219/69 W |
| 4,806,721 A | 2/1989 | Ito et al. | 219/69 W |
| 4,977,303 A | 12/1990 | Briffod | 219/69.12 |

FOREIGN PATENT DOCUMENTS

| | | |
|---|---|---|
| JP | 1982000234738 | 7/1984 |
| JP | 1982000234739 | 7/1984 |
| JP | 1984000236157 | 6/1986 |

OTHER PUBLICATIONS

Hansen, Constitution of Binary Alloys, McGraw–Hill, 1958, p. 650.*

* cited by examiner

*Primary Examiner*—M. Alexandra Elva

(57) ABSTRACT

A method for manufacturing an eroding electrode which has an outer layer consisting of a structural composition having a resistance against erosive wear characteristic many times greater than the common eroding electrode. The outer layer initially consists of one or several coatings of a metal alloy having a low volatilization temperature encasing a core of metal or a metal alloy. The encased wire electrode is then annealed at such temperatures until an alloy, which extends from the outer surface of the encasement toward the core, is created and which has a decreasing content of the consitutents of the low volatilzation temperature material or alloy, after which the wire electrode is cooled in a controlled manner to fix the diffusion states.

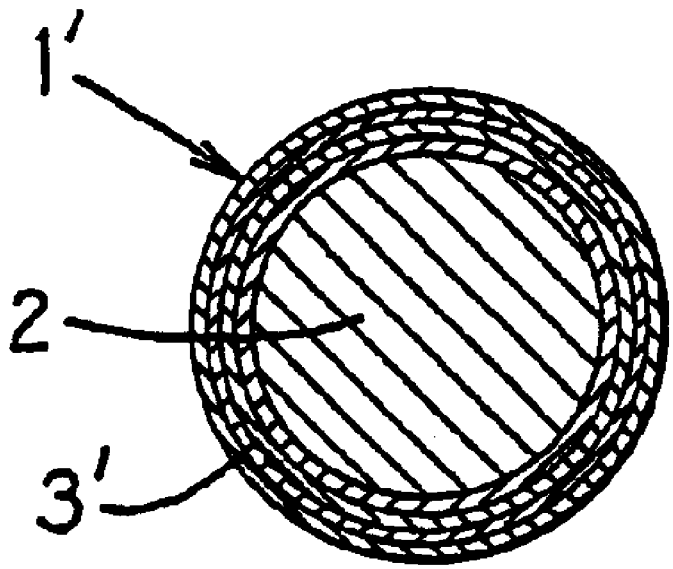

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 2–5, 7–9, 11, 13–14, 16–18, and 21–29 is confirmed.

Claims 1, 6, 10, 12, 15, 19 and 20 were previously cancelled.

\* \* \* \* \*